July 13, 1948.    R. D. MINDLIN    2,445,307
FORCE GAUGE
Filed March 31, 1943

INVENTOR
RAYMOND D. MINDLIN
BY
ATTORNEY

Patented July 13, 1948

2,445,307

UNITED STATES PATENT OFFICE 2,445,307

FORCE GAUGE

Raymond D. Mindlin, New York, N. Y., assignor to the United States of America as represented by the Secretary of the Navy Application March 31, 1943, Serial No. 481,315

4 Claims. (Cl. 73—167)

This invention relates to testing devices and has particular reference to a novel gauge for indicating the magnitudes of the forces to which a rotary projectile is subjected, such as setback and impact. The new gauge is simple and compact in construction, is adapted for manufacture at low cost and operates positively and reliably to provide accurate indications.

One object of the invention resides in the provision of a novel force gauge which may be mounted in a rotary projectile for use in comparing the force of setback during acceleration of the projectile in the gun barrel with the force of impact when the projectile strikes an object, such as the ground, so that information concerning the conduct of elements mounted in the projectile may be obtained. A gauge made in accordance with the invention comprises a marker operable by a force of setback, and a recording medium for receiving from the marker an indication of the magnitude of the force of setback. When the recording medium has received from the marker an indication of the initial setback force, the marker and the recording medium are moved relatively, as by centrifugal action due to rotation of the projectile, whereby the recording medium is in position to receive from the marker an additional indication of the final setback force when the projectile strikes an object. In the preferred construction, the recording medium is normally held in a predetermined position relative to the marker by means operable under the action of centrifugal force to release the recording medium, whereupon the recording medium is moved outwardly by centrifugal force to a second position for receiving an indication of the final setback force.

Another object of the invention is to provide a setback gauge of simple construction which occupies only a small space in the projectile.

These and other objects of the invention may be better understood by reference to the accompanying drawing, in which Fig. 1 is a side view of a projectile embodying one form of the new gauge, with part of the projectile broken away to show the gauge;

Figure 1:
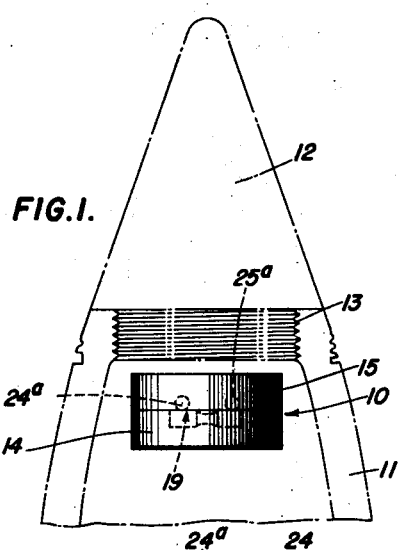
Figure 2:
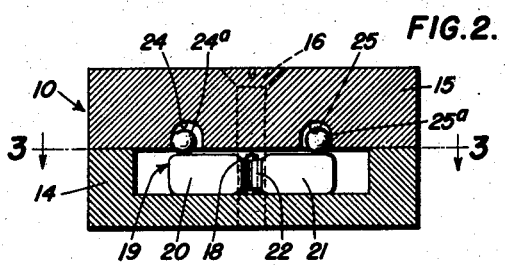
Fig. 2 is an enlarged longitudinal sectional view of the gauge illustrated in Fig. 1, showing the recording means in its initial position.
Figure 3:
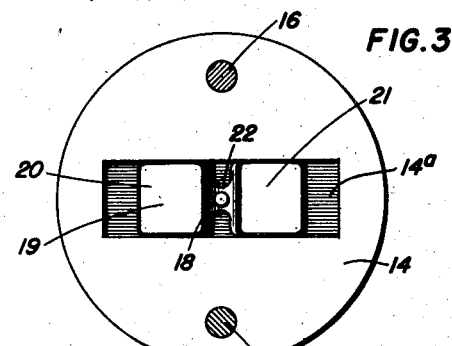
Fig. 3 is a sectional view on the line 3—3 in Fig. 2.

Referring to the drawing, the setback gauge 10 is shown in a projectile comprising a casing 11 and a nose 12 secured to the casing, as by means of threads 13. The gauge 10 comprises a cylindrical housing including two sections 14 and 15 held together by screws 16, the housing being mounted in the projectile casing 11 in any suitable manner with the section 15 facing the nose.

The rear section 14 of the gauge housing has an elongated recess 14a in its front face, and extending forwardly from the bottom of the recess is a pin 18 disposed on the axis of the housing, which corresponds to the axis of the projectile. A record receiving body 19 is mounted in the recess 14a on the axis pin 18 and, as shown, comprises two slugs 20 and 21 of relatively soft metal, such as lead, joined together by a relatively thin frangible web 22 having a central opening through which the pin 18 projects. The recess 14a is considerably longer than the impression receiving body 19 so that there is a substantial clearance between the outer ends of the slugs 20, 21 and the adjacent ends of the recess.

In the rear face of the front housing section 15 are two spaced sockets 24 and 25 adjacent the outer end portions of the slugs 20 and 21, respectively. The sockets 24 and 25 contain markers 24a and 25a, respectively, in the form of steel balls, such as hardened ball bearings. The markers fit loosely in the sockets so that they are movable rearwardly against the slugs 20 and 21 under a force of setback.

Figure 6:
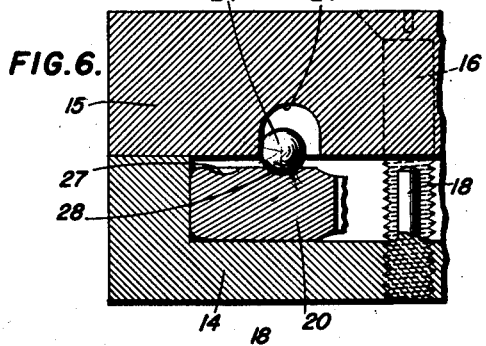
Fig. 6 is an enlarged view of part of the gauge illustrated in Fig. 2, showing the position of the parts when the projectile strikes an object.
Figure 4:
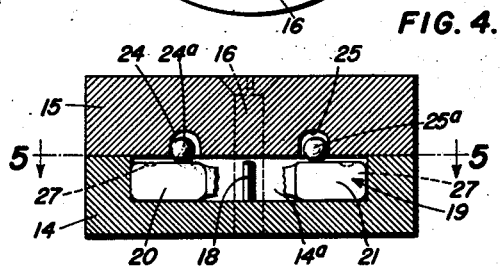
Fig. 4 is a view similar to Fig. 2 showing the recording means in its final position.
Figure 7:
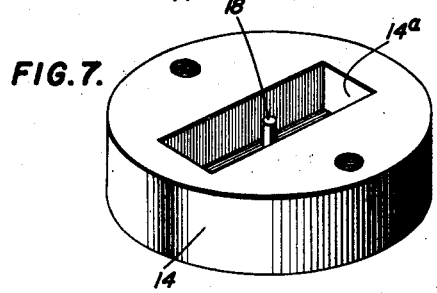
Fig. 7 is a perspective view of part of the housing of the gauge.
Figure 5:
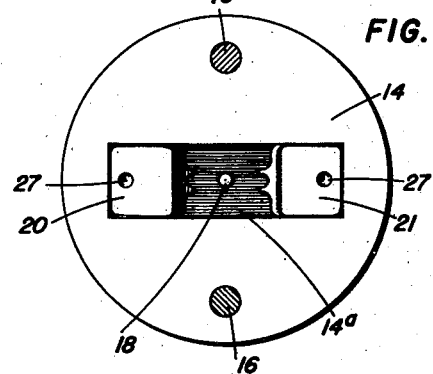
Fig. 5 is a sectional view on the line 5—5 in Fig. 4.
Figure 8:
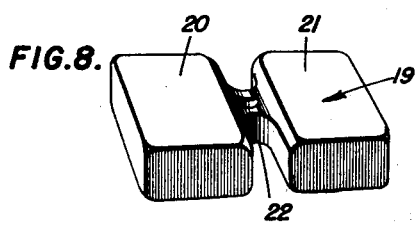
Fig. 8 is a perspective view of the recorder.

When the projectile is fired from a gun, the initial force of setback incident to acceleration of the projectile in the gun barrel causes the markers 24a and 25a to move rearwardly with considerable force against the recorder 19, which is held stationary by the bottom of recess 14a, and, as a result, the markers make depressions 27 in the outer portions of the relatively soft slugs 20 and 21, respectively. Thereafter, when the projectile approaches its maximum velocity and maximum speed of rotation, the centrifugal force on the slugs 20 and 21 is sufficient to fracture the web 22. Accordingly, the slugs move outwardly in the recess 14a under the action of the centrifugal force, the outward movement of the slugs being limited by the ends of the recess. It will be understood that by the time the centrifugal force on the slugs is sufficient to break the web 22, the pressure of the markers on the slugs is relieved due to dissipation of the initial force of setback, so that the markers do not afford any appreciable resistance to breaking of the web or to outward movement of the slugs in the recess 14a. Since the markers 24a and 25a are spherical, they roll easily out of the depressions 27 on outward movement of the slugs and roll against the side walls of sockets 24 and 25, respectively, under the centrifugal force. In firing the projectile for test purposes, its flight is such that the projectile strikes the ground base first in a substantially vertical descent. Accordingly, when the projectile strikes the ground, the markers 24a and 25a are again moved rearwardly against the slugs 20 and 21, respectively, under the final force of setback. However, since the slugs are now in their outermost positions in recess 14a, the inner portions of the slugs receive the resulting impressions 28 from the markers, as shown in Figs. 4 and 6.

It will be apparent that the diameters or depths of the depressions 27 and 28 are measures of the initial and final forces of setback, respectively, in the projectile. By comparing the relative sizes of the depressions 27 and 28, it is possible to compare the forces of setback incident to firing the projectile with the forces of impact when the projectile strikes the ground. The gauge is particularly suited for testing various components to be used in projectiles. For example, by the use of the new gauge it may be determined whether forces greater than a component can reasonably be expected to withstand are present in the projectile when it is fired from the gun or when it strikes an object such as the ground.

It will be understood that many changes may be made in the arrangement and details of parts described without departing from the spirit of the invention as set forth in the accompanying claims. I, therefore, do not wish to be limited to the exact details shown and described as the preferred form only has been shown by way of illustration.

I claim:

1. A setback gauge for rotary projectiles which comprises a pair of markers operable by a force of setback, a pair of slugs for receiving from said markers an indication of the magnitude of the force of setback, and means for holding the slugs in predetermined positions relative to the markers and operable by centrifugal force to release the slugs, the slugs when released being movable by centrifugal force to different positions relative to the markers.

2. A setback gauge for rotary projectiles which comprises a housing having a recess and a communicating socket therein, a recording medium in a predetermined position in the recess and movable to a second position under the influence of centrifugal force, and a marker formed of material relatively harder than that of the recording medium freely contained in the socket and free to bear against the recording medium whereby the initial and final setback forces will cause the marker to produce two separate impressions on the recording medium, the sizes of which indicate the magnitude of the corresponding forces.

3. A gauge adapted for mounting in a projectile subjected to centrifugal force when in flight comprising a housing having a recess and at least two sockets therein, a recording medium in a predetermined position in the recess and movable to a second position under the influence of centrifugal force, a marker formed of material relatively harder than that of the recording medium freely contained in each of the sockets and free to bear against the recording medium, at least one marker being so positioned relative to the recording medium whereby the initial setback force will cause the marker to produce an impression on the recording medium, and at least one marker being so positioned relative to the recording medium whereby the force of final impact of the projectile will cause the marker to produce another separate impression on the recording medium, the sizes of the impressions indicating the magnitude of the corresponding forces.

4. A gauge adapted for mounting in a projectile subjected to centrifugal force when in flight comprising a housing having a recess and at least two sockets therein, recording means in said recess comprising a pair of slugs retained in a predetermined position relative to each other and relative to said sockets, said slugs being separable under the action of centrifugal force whereby the slugs move outwardly within the recess to different positions relative to the said sockets, a marker formed of material relatively harder than that of the slugs freely contained in each of the sockets and each free to bear against one of the slugs whereby the initial setback force and the force of final impact of the projectile will cause the markers to produce separate impressions on at least one slug, the size of the impressions indicating the magnitude of the corresponding forces.

RAYMOND D. MINDLIN.

REFERENCES CITED

The following references are of record in the file of this patent:

UNITED STATES PATENTS

| Number | Name | Date |
|---|---|---|
| 2,155,635 | Bennett | Apr. 25, 1939 |
| 2,195,451 | Edwards | Apr. 2, 1940 |

FOREIGN PATENTS

| Number | Country | Date |
|---|---|---|
| 7,161 | Switzerland | Aug. 4, 1883 |